(12) United States Patent
Vanslette

(10) Patent No.: US 10,937,341 B2
(45) Date of Patent: Mar. 2, 2021

(54) PEEL-ABLE, TAMPER-EVIDENT SECURITY LABEL FOR CONCEALING INFORMATION

(71) Applicant: Apple Inc., Cupertino, CA (US)

(72) Inventor: Jeremy Vanslette, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/519,771

(22) Filed: Jul. 23, 2019

(65) Prior Publication Data
US 2020/0090553 A1 Mar. 19, 2020

Related U.S. Application Data

(60) Provisional application No. 62/922,211, filed on Sep. 17, 2018.

(51) Int. Cl.
| | |
|---|---|
| *G09F 3/00* | (2006.01) |
| *B42D 15/02* | (2006.01) |
| *G09F 3/10* | (2006.01) |
| *B41M 3/14* | (2006.01) |
| *B32B 7/06* | (2019.01) |
| *B42D 25/30* | (2014.01) |

(Continued)

(52) U.S. Cl.
CPC .............. *G09F 3/0292* (2013.01); *B32B 7/06* (2013.01); *B41M 3/14* (2013.01); *B42D 15/025* (2013.01); *G09F 3/0288* (2013.01); *G09F 3/10* (2013.01); *B42D 25/30* (2014.10)

(58) Field of Classification Search
CPC ........ G09F 3/0292; G09F 3/10; G09F 3/0288; B41M 3/14; B42D 15/025; B42D 25/30; B32B 7/06

USPC ....... 283/72, 94, 98, 99, 100, 110, 111, 901, 283/904
See application file for complete search history.

(56) References Cited

U.S. PATENT DOCUMENTS

| | | | |
|---|---|---|---|
| 1,162,230 A | 11/1915 | Foster | |
| 5,895,075 A * | 4/1999 | Edwards | .............. G06K 7/1434 283/100 |

(Continued)

FOREIGN PATENT DOCUMENTS

| | | |
|---|---|---|
| EP | 1147921 A2 | 4/2001 |
| EP | 1130563 A2 | 9/2001 |

(Continued)

OTHER PUBLICATIONS

International Search Report and Written Opinion of the International Searching Authority for PCT/US2019/047054, dated Nov. 8, 2019, 16 pages.

*Primary Examiner* — Justin V Lewis
(74) *Attorney, Agent, or Firm* — Sterne, Kessler, Goldstein & Fox P.L.L.C.

(57) ABSTRACT

A visual-information security system that includes an information security label positioned to conceal visual information on a substrate. The information security label may include a spiral-shaped cut (or other complex shape) within the body of the label and a pull-tab, such that when a user pulls on the tab, the label peels off of the substrate in a spiral pattern, revealing the information concealed beneath the label. The complex-shaped cut makes reapplication of the label difficult and evident, thus providing security to consumers. The label may include multiple layers of material, for example, a peel-off layer and an adhesive layer.

19 Claims, 8 Drawing Sheets

(51) Int. Cl.
*B42D 25/23* (2014.01)
*B42D 25/305* (2014.01)

(56) References Cited

U.S. PATENT DOCUMENTS

| | | | |
|---|---|---|---|
| 6,086,107 | A | 7/2000 | Whistler et al. |
| 6,635,326 | B2 | 10/2003 | Ueki et al. |
| 6,679,970 | B2 | 1/2004 | Hwang |
| 7,166,345 | B2 | 1/2007 | Myers et al. |
| 2002/0026738 | A1 | 3/2002 | Shiga et al. |
| 2012/0193432 | A1* | 8/2012 | Biskupski ............ B42D 15/025 235/488 |
| 2015/0090625 | A1* | 4/2015 | Bauss .................... B65D 41/62 206/459.5 |
| 2016/0022500 | A1 | 1/2016 | Tumey |
| 2016/0221740 | A1 | 8/2016 | Tinoco |
| 2017/0283148 | A1 | 10/2017 | Sin et al. |

FOREIGN PATENT DOCUMENTS

| | | |
|---|---|---|
| KR | 101466302 B1 | 11/2014 |
| WO | 9529475 A1 | 11/1995 |

\* cited by examiner

PEEL-ABLE, TAMPER-EVIDENT SECURITY LABEL FOR CONCEALING INFORMATION

CROSS-REFERENCE TO RELATED APPLICATION

This application claims the benefit of U.S. Provisional Patent Application No. 62/922,211, filed Sep. 17, 2018, entitled "PRINTED-INFORMATION SECURITY SYSTEM AND INFORMATION SECURITY LABEL," which is incorporated herein in its entirety by reference thereto.

BACKGROUND

The described embodiments relate generally to security systems for concealing information. More particularly, the embodiments relate to peel-able, tamper-evident security labels for concealing visual information.

Transaction cards may include visual information (e.g., an account number or authorization code) that is intended to remain hidden until the card is in the possession of its end user. Such visual information may be covered by a security label that conceals the visual information. The security label may be removed—ideally by the end user—to reveal the previously-concealed information.

SUMMARY

Various embodiments are disclosed that relate to visual-information security systems that may include a tamper-evident information label configured to conceal information disposed on a substrate (e.g., a transaction card). The information security label may be peel-able, and may be configured to split apart during removal such that reapplication of the label is difficult once it has been removed, and such that an attempted re-application will be visually evident.

For example, embodiments include an information security label for removably concealing information, where the security label includes a concealing layer having a pull-tab. The concealing layer may include a continuous cut therethrough, where the cut defines a pathway of the label. The pathway may originate at the pull-tab and terminate within the label at a position spaced away from any outer edge of the label.

Embodiments also include a visual-information security system, where the system includes a substrate having visual information thereon and a tamper-evident label disposed over and concealing the information. When a user pulls the label away from the substrate, the label splits apart along a cut to peel off of the substrate in the form of a continuous strip to reveal the information.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
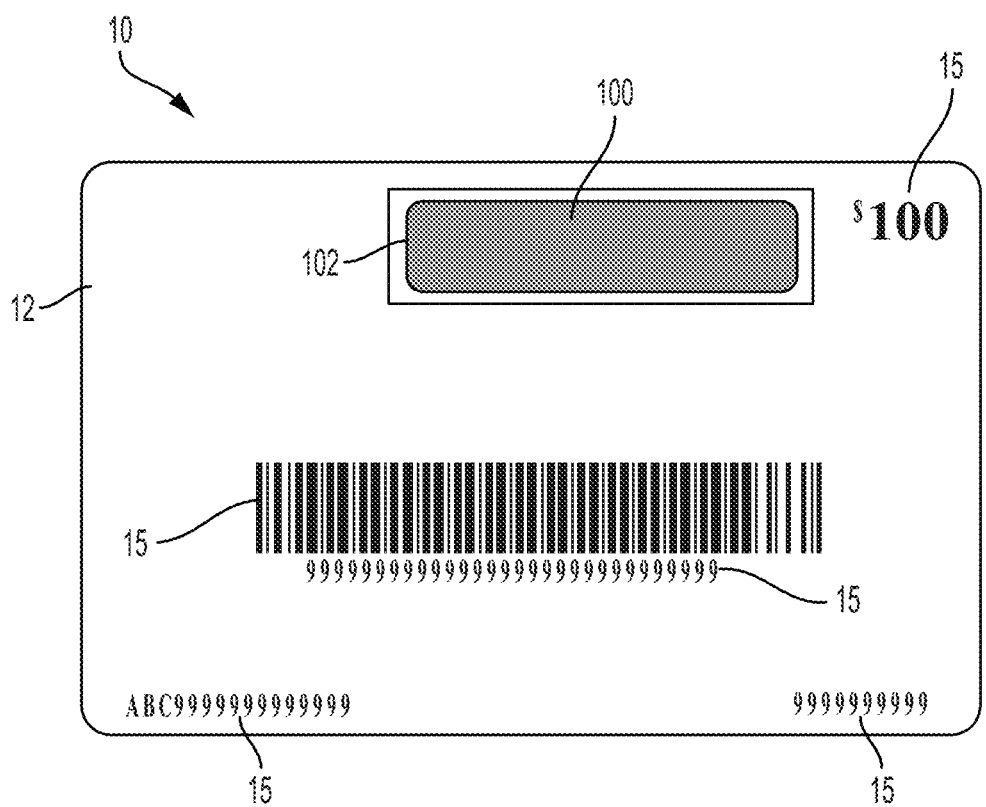
FIG. 1 shows a visual-information security system having an information security label.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Transaction cards are commonly used to represent a monetary value that may be redeemed for goods, services, discounts, cash or the like. Some transaction cards may include visual information (e.g., a unique code) disposed on the card that is used to activate the card and to keep track of the value assigned to the card. For example, a user may purchase a transaction card from a vendor, and during the transaction the unique code disposed on the card is used to activate the card so that the user may redeem the value of the card (e.g., by entering the unique code into an online system where the value of the card may be used to make purchases).

The transaction card may be any tangible card, document, or the like having information disposed thereon. The transaction card may be, for example, a stored-value card, gift card, telephone card, discount card, coupon, lottery ticket, or other card or document with visual information disposed thereon. The visual information may include, for example, any visual human-readable representation of data or any optical machine-readable representation of data. Examples include text having any number of characters or symbols, indicia, a linear barcode (e.g., a Universal Product Code ("UPC")), and/or a matrix barcode (e.g., a Quick Response ("QR") Code). The transaction card or its visual information may have no associated value until the transaction card is activated using its visual information.

Since the information disposed on the card may be associated with a certain value, it may be desirable to secure the visual information such that only an authorized user (e.g., the purchaser of the card) may view the visual information. Some existing visual-information security systems may include, for example, a removable label that is disposed to conceal the visual information. The transaction card may also include an activation barcode or magnetic strip, for example, that corresponds to the concealed visual information and is used to activate the concealed visual information during a transaction with the user. In this manner, the concealed visual information may be assigned a value during a transaction without the label being removed. Then, when a user is ready to redeem the value of the card, the user may remove the removable label and view the visual information.

Some existing information security systems may include a peel-off label that is configured to conceal information that is disposed on a transaction card until a user peels off the label. Such peel-off labels may be quickly and easily removed, providing users with efficient access to the concealed visual information. Further, as an alternative to some other security labels—such as scratch-off labels—peel-off labels may not require a coin or other hard object to aid in removing the label, and may not produce small bits of debris during removal.

Some existing peel-off labels may include an opaque portion and an adhesive, where the opaque portion conceals the visual information and the adhesive secures the label to the transaction card. When a user pulls on an edge of the label, the label may peel off the card in one piece, revealing the visual information. Since the label may remain substantially intact during removal, however, a thief or other unscrupulous party may remove or partially remove the peel-off label before the card has been sold to a user, obtain the visual information, and then reapply the label, leaving little or no evidence that the label has been previously removed. Since it may not be apparent that the label has been tampered with, a user may purchase the card without realizing that the visual information has been compromised. Then, after the card has been purchased and activated, the thief may redeem the value associated with the card by entering the ill-gotten information into the appropriate online or other system to redeem the value of the card before the rightful purchaser has the opportunity to do so.

Embodiments as described herein provide visual-information security systems that include a tamper-evident information security label for concealing visual information. Such information security labels may be peel-off labels configured to be easily removed from a transaction card but difficult to reapply to the card without it being visually apparent that the card has been tampered with. Thus, such visual-information security systems may provide users with both convenience and security.

Some information security labels as described herein may include, for example, a concealing layer (which may be opaque, for example), an adhesive layer, a pull-tab, and a continuous cut within the concealing layer that defines a continuous strip of material. The label may be adhered to the surface of a transaction card and positioned to conceal the visual information disposed on the card. A user may remove the label by pulling on the pull-tab, which causes the concealing layer to separate along the cut, and which causes the continuous strip of material to continuously peel away from the card. The visual information may be disposed such that a significant portion of the label must be peeled away from the card before the visual information is revealed. Since the label splits into continuous strips of material when removed, it may be difficult to recreate the original appearance of the label without leaving evidence of tampering, thus providing security to users and sellers who may avoid purchasing or selling/activating a transaction card with a visibly compromised label.

In some embodiments, the cut may be in the shape of a spiral, so that when the user pulls on the pull-tab, the label splits and peels away starting around the outer edge of the label, and continuing inward along a spiral path until the concealed visual information is revealed (e.g., upon full removal of the label). Other shapes and paths are possible, as explained in more detail below.

These and other embodiments are discussed below with reference to FIGS. 1-12. However, those skilled in the art will readily appreciate that the detailed description given herein with respect to these figures is for explanatory purposes only and should not be construed as limiting.

Figure 2:
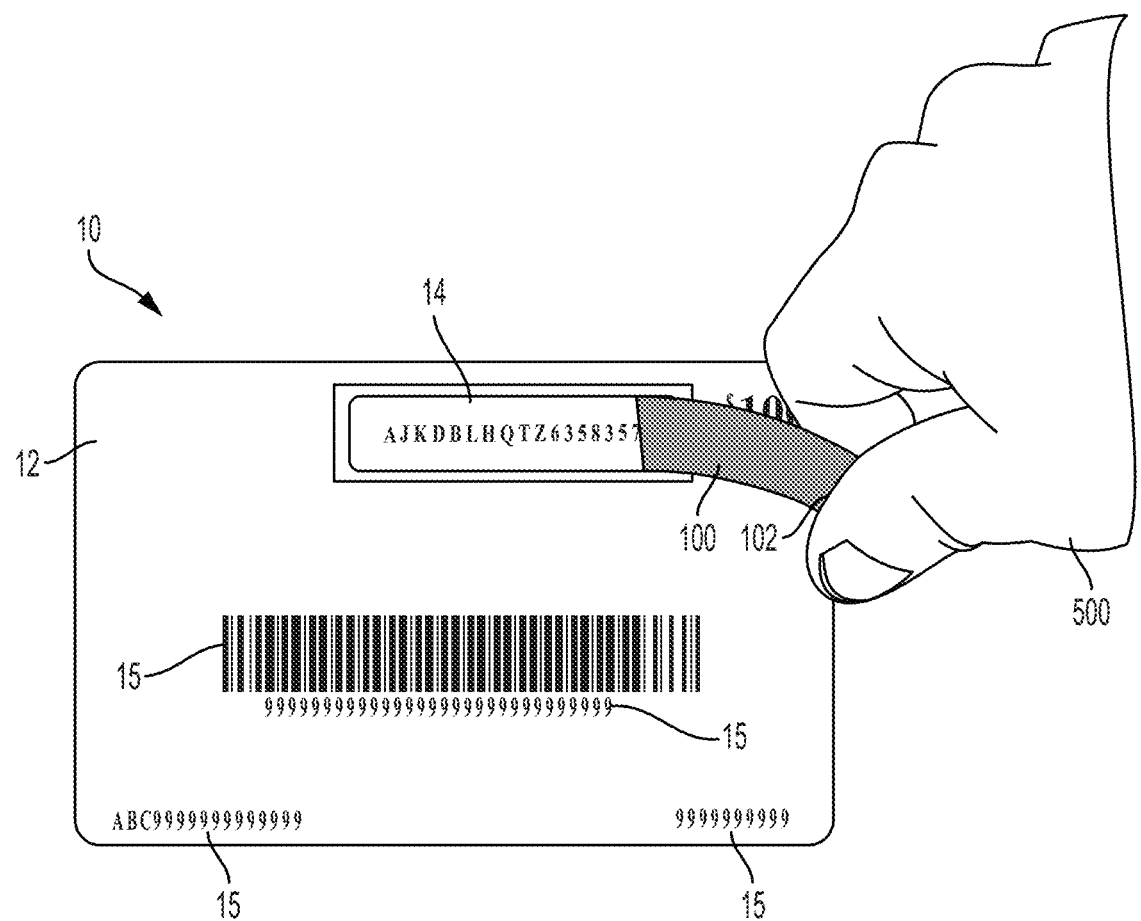
FIG. 2 shows the visual-information security system of FIG. 1 with the information security label partially removed by a user.
Figure 3:
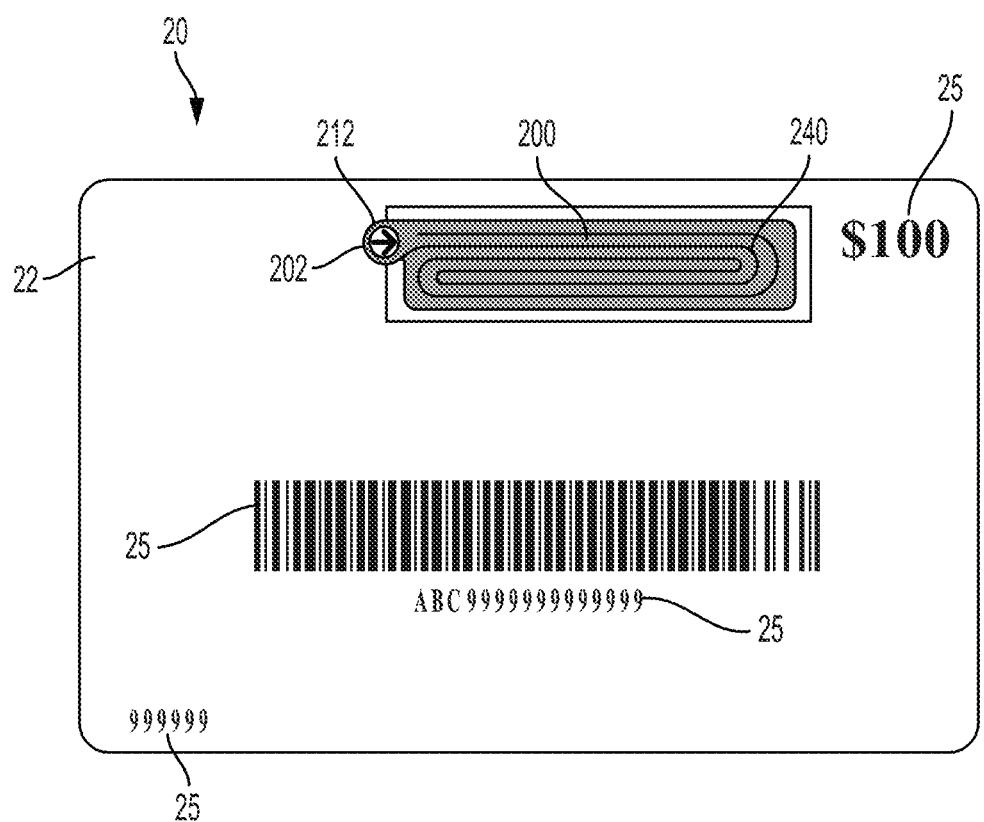
FIG. 3 shows a visual-information security system having an information security label.
Figure 4:
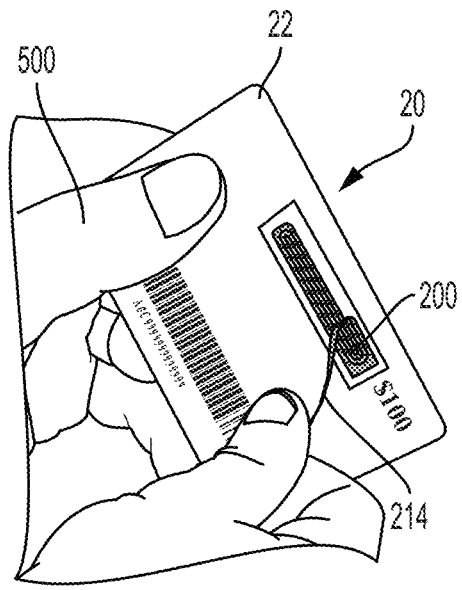
FIGS. 4-8, in sequence, show a user removing the information security label of the visual-information security system of FIG. 3.
Figure 5:
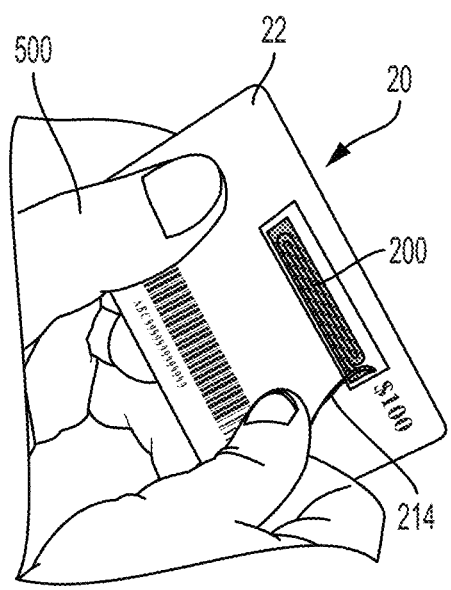
Figure 6:
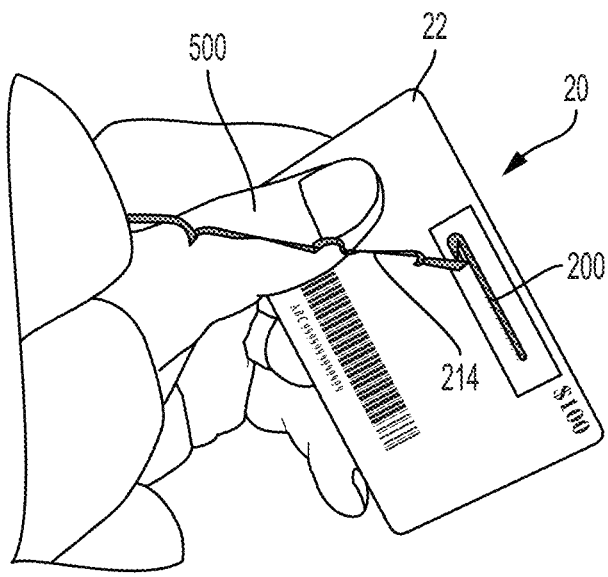
Figure 7:
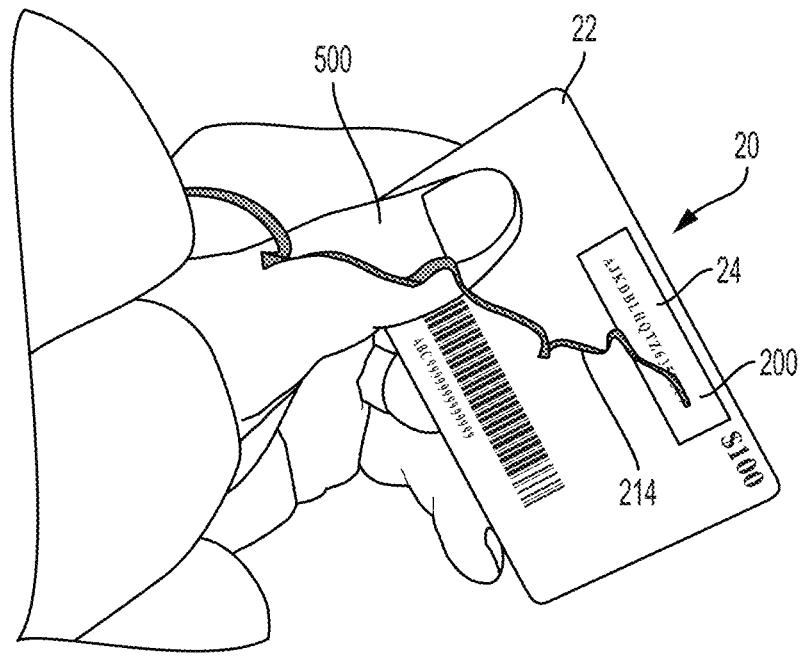
Figure 8:
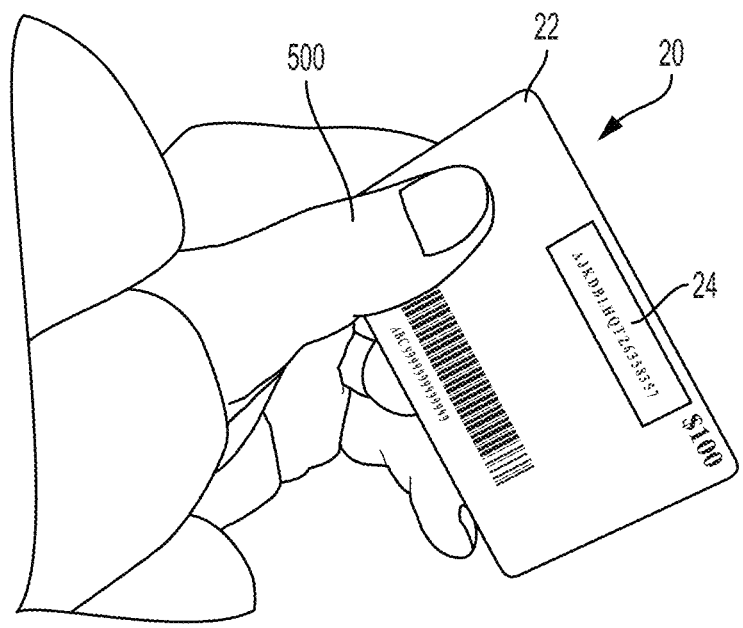

FIGS. 1 and 2 show a visual-information security system 10, which may include a substrate 12 having information 14 disposed thereon and an information security label 100. Substrate 12 may be, for example, any tangible card, document, or the like that includes visual information. Visual information 14 may be any visual human-readable representation of data or any optical machine-readable representation of data, including, for example, text having any number of characters or symbols, indicia, a linear barcode (e.g., a UPC), and/or a matrix barcode (e.g., a QR Code). In some examples where visual information 14 is printed on substrate 12, the information may be printed on substrate 12 using any printing method such as, for example, ink printing, laser printing, or the like. In some embodiments, substrate 12 may be, for example, a transaction card. Substrate 12 may include other visual information that is unconcealed, such as unconcealed visual information 15, which may include identification information, account information, value indications, use descriptions or instructions, visual representations of data (e.g., barcodes), etc.

Information security label 100 may be disposed to cover and conceal visual information 14, and may be adhered to substrate 12 using an adhesive. As shown in FIG. 2, a user 500 may remove information security label 100 by pulling on a first end 102 of information security label 100. As the user 500 continues to pull first end 102 away from substrate 12, information security label 100 remains substantially intact and visual information 14 becomes visible to the user 500.

As described above, since information security label 100 remains substantially intact as it is removed, information security label 100 may be peeled off and reapplied to substrate 12 with little or no evidence that information security label 100 has been compromised. As such, a bad actor may remove label 100, obtain visual information 14, and reapply label 100 with little or no evidence of the act. This can be detrimental, since information security label 100 is intended to keep information 14 confidential until it has been removed by the rightful user (e.g., the purchaser or rightful recipient of card 10), who may have no knowledge that a bad actor has previously viewed information 14.

FIGS. 3-8 show a visual-information security system 20, which may include a substrate 22 having information 24 disposed thereon (e.g., on a surface thereof) and an information security label 200. Information security label 200 may be a tamper-evident label. Substrate 22 may be, for example, any tangible card, document, or the like that includes visual information. Visual information 24 may be any visual human-readable representation of data or any optical machine-readable representation of data, including, for example, text having any number of characters or symbols, indicia, a linear barcode (e.g., a UPC), and/or a matrix barcode (e.g., a QR Code). In some embodiments visual information 24 is confidential information. In some examples where visual information 24 is printed on substrate 22, the information may be printed on substrate 22 using any printing method such as, for example, ink printing, laser printing, or the like. In some embodiments, visual information 24 may be textured. In some embodiments, substrate 22 may be, for example, a transaction card. Substrate 22 may include other visual information that is unconcealed, such as unconcealed visual information 25, which may include identification information, account information, value indications, use descriptions or instructions, visual representations of data (e.g., barcodes), etc.

Information security label 200 may be disposed to cover and conceal visual information 24, and may be adhered to substrate 22 (e.g., using an adhesive). Information security label 200 may include a cut 240 within information security label 200. As shown in FIGS. 4-8, a user 500 may remove information security label 200 by pulling on a pull-tab 212 disposed at a first end 202 of information security label 200. As the user 500 continues to pull pull-tab 212 away from substrate 22, information security label 200 splits apart along cut 240 into narrow, continuous strips of material 214, which may peel away from substrate 22 in an inward spiral manner following cut 240 (e.g., in the case where cut 240 is spiral shaped, as shown). In other words, information security label 200 may peel away in different directions as it is pulled by a user (e.g., back-and-forth along the length of security label 200, as shown in FIGS. 4-8). Visual information 24 may be disposed beneath the center of information security label 200 and, thus, visual information may be revealed or shown to user 500 only after a significant portion of label 200 has been peeled away from substrate 22.

As shown in FIGS. 4-8 and described above, by pulling pull-tab 212, the entirety of information security label 200 may be pulled away in a single continuous piece that no longer has the same outer shape as it did when it was originally adhered to substrate 22. Since information security label 200 splits apart during removal, it may be difficult to recreate the original appearance of information security label 200 without leaving visible evidence of tampering, thus providing security to users and sellers who may avoid purchasing or selling/activating a transaction card with a visibly compromised label. In this manner, information security label 200 may maintain the convenience and ease of use of existing peel-off labels, but may also provide consumers and sellers with added security.

Figure 9:
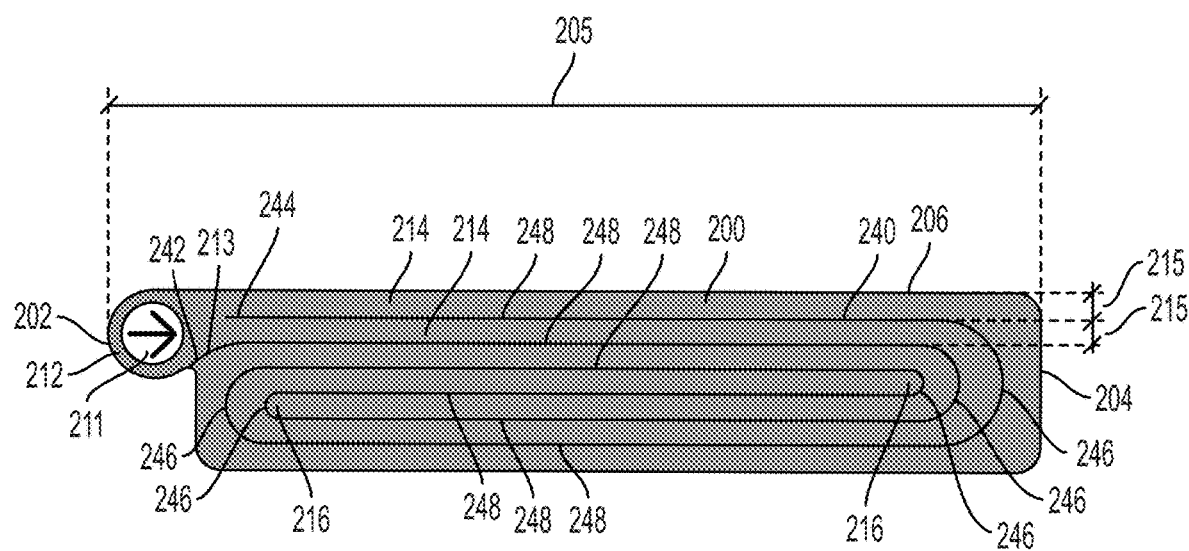
FIG. 9 shows the information security label of the information security system of FIG. 3.

As shown in FIG. 9, information security label 200 includes a second end 204 disposed opposite first end 202. The distance between first and second ends 202, 204 may define an intact length 205 of information security label 200. In some embodiments, intact length 205 of information security label 200 may be between approximately 20-80 millimeters. A perimeter 206 may define the shape of information security label 200. Information security label 200 is shown to have a generally rounded rectangular shape, however, it may take other shapes as well, including, for example, a square (see FIG. 11, for example), circular, elliptical, polygonal or non-polygonal shape and may or may not be symmetrical about any axis. In some embodiments, information security label 200 is flat.

Figure 10:
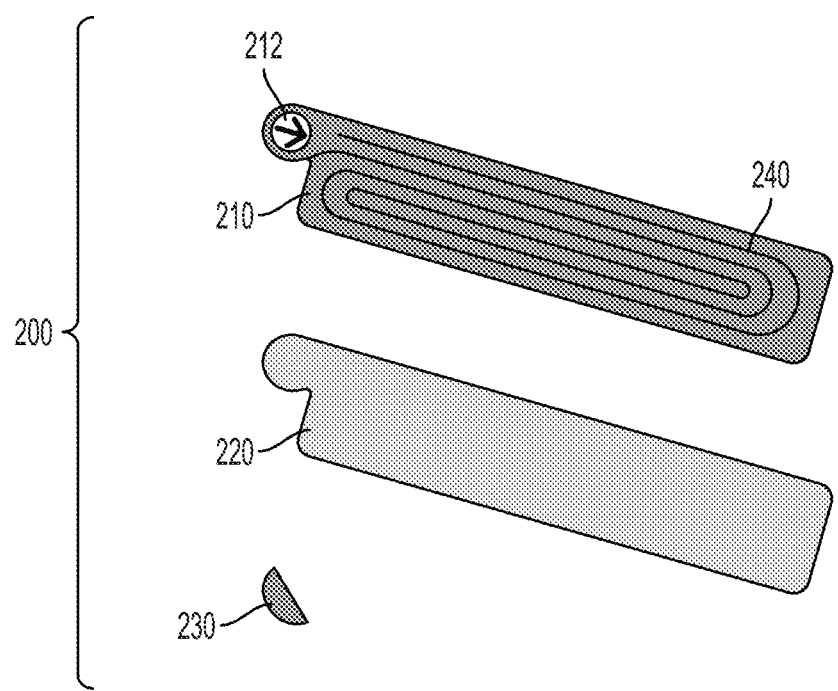
FIG. 10 shows an exploded view of the information security label of FIG. 9.

FIG. 10 shows an exploded view of information security label 200. As shown, information security label 200 includes a peel-off layer 210, an adhesive layer 220, and a deadening layer 230. Peel-off layer 210 may be a concealing layer configured to conceal visual information 24 until peel-off layer 210 is removed by a user. In some embodiments, peel-off layer 210 may be sufficiently opaque such that a user may not see visual information 24 through peel-off layer 210. In some embodiments, peel-off layer 210 may be formed of a scratch-off ink, such that a user may either peel off or scratch off layer 210 in order to reveal visual information 24. Peel-off layer 210 may be formed of, for example, varnish, scratch-off ink, release lacquer, polyester, and/or dry peel coating. In some embodiments where visual information 24 is textured, peel-off layer 210 may be sufficiently thick or rigid such that visual information 24 may not be seen or felt through peel-off layer 210.

Adhesive layer 220 may be disposed between peel-off layer 210 and substrate 22 to temporarily adhere information security label 200 to substrate 22. In some embodiments, adhesive layer 220 may have the same size and shape as intact peel-off layer 210. Adhesive layer 220 may include an adhesive such as, for example, glue, cement, paste, or other substance capable of adhering peel-off layer 210 to substrate 22. In some embodiments, adhesive layer 220 may directly adhere peel-off layer 210 to substrate 22. In other embodiments, information security label 200 may include intervening layers disposed between adhesive layer 220 and/or peel-off layer 210 such that adhesive layer 220 indirectly adheres peel-off layer 210 to substrate 22.

In some embodiments, when a user removes peel-off layer 210, adhesive layer 220 may remain on substrate 22 after peel-off layer 210 has been removed from substrate 22. Adhesive layer 220 may be sufficiently transparent such that a user may see visual information 24 though adhesive layer 220. Adhesive layer 220 may be more strongly adhered to substrate 22 than to peel-off layer 210 such that adhesive layer 220 remains on substrate 22 while and after peel-off layer 210 is peeled off. Adhesive layer 220 may have insufficient strength to resist a peel force applied by a user to information security label 200, thereby allowing the user to manually remove peel-off layer 210 in a single continuous strip of material 214, leaving adhesive layer 220 behind. Adhesive layer 220 may have sufficient strength to resist a shear force applied by a user to information security label 200 such that peel-off layer 210 may not be sheared off of substrate 22, leaving adhesive layer 220 behind, without disturbing the original appearance of peel-off layer 210.

In some embodiments, pull-tab 212 may be formed as a part of peel-off layer 210, and may help a user remove peel-off layer 210 by providing a surface whereby the user may begin to remove peel-off layer 210. Pull-tab 212 is shown to be disposed at first end 202 of information security label 200, however, in other embodiments it may disposed elsewhere along perimeter 206 of information security label 200. Pull-tab 212 may include a graphic 211 to indicate to a user that it is meant to be pulled (e.g., an arrow as shown).

In some embodiments, a deadening layer 230 may be used to reduce or weaken the adhesiveness of certain portions of adhesive layer 220. Deadening layer 230 may be used, for example, to reduce or weaken the adhesiveness of the portion of adhesive layer 220 beneath pull-tab 212, thereby making it easier for a user to grasp pull-tab 212 and begin peeling peel-off layer 210. In some embodiments, deadening layer 230 may sufficiently reduce the adhesiveness of adhesive layer 220 such that pull-tab 212 is unattached to substrate 22. In some embodiments, deadening layer 230 may sufficiently reduce the adhesiveness of adhesive layer 220 such that pull-tab 212 is only partially adhered to substrate 22. In some embodiments, deadening layer 230 may sufficiently reduce the adhesiveness of adhesive layer 220 such that pull-tab 212 is more weakly adhered to substrate 22 than other portions of peel-off layer 210. In some embodiments, no adhesive may be disposed beneath pull-tab 212, and no deadening layer 230 may be included in information security label 200.

Although shown in FIG. 10 as having only three layers, information security label 200 may include any number of layers that include materials and/or properties not described above.

Cut 240 may be disposed in information security label 200 and may be used to control the manner in which peel-off layer 210 splits apart and peels away from substrate 22 when being removed by a user. Cut 240 may include a first end 242 and a second end 244 defining a length of cut 240. The length of cut 240 is the distance that cut traverses within the outer perimeter 206 of information security label 200. In some embodiments, cut 240 may be at least two times as long as the maximum intact length 205 of information security label 200. In some embodiments, cut 240 may be between two and four times as long as the maximum intact length 205 of information security label 200. In some embodiments, the length of cut 240 may be between approximately 40-320 millimeters.

Cut 240 may be configured such that first end 242 of cut 240 intersects perimeter 206, and second end 244 of cut 240 may be disposed within perimeter 206 and spaced away from perimeter 206. Pull-tab 212 may be disposed immediately adjacent to first end 242 of cut 240 such that when pull-tab 212 is pulled, peel-off layer 210 first splits apart at perimeter 206, and then continues to split apart along the path of cut 240 (see FIGS. 4-8).

Cut 240 may be continuous, which is to say that it follows a continuous path with no breaks and does not intersect with itself. Cut 240 may follow a variety of complexly shaped paths within perimeter 206. In some embodiments, cut 240 may follow a continuously curving path. In some embodiments, cut 240 may follow a curved path that includes both straight and curved segments. In some embodiments, cut 240 may be formed solely of straight segments (e.g., connected at angles, such as in a rectilinear spiral or serpentine shape). In some embodiments, cut 240 may follow a path that defines more than one shape. In some embodiments, information security label may include more than one continuous, but separate, cut 240.

Cut 240 may be a score. Cut 240 may be deep enough to sufficiently weaken peel-off layer 210 such that it splits apart along the path of cut 240 when a user pulls on pull-tab 212. In some embodiments, cut 240 may extend only partially through information security label 200. For example, cut 240 may extend through peel-off layer 210 but not adhesive layer 220. As described above, adhesive layer 220 may be transparent and may be more strongly adhered to substrate 22 than to peel-off layer 210, thereby allowing adhesive layer 220 to remain attached to substrate 22 while and after peel-off layer 210 is peeled off by a user, and preventing information security label 200 from separating from substrate 22 without splitting apart.

In some embodiments, cut 240 may extend completely through information security label 200. Adhesive layer 220 may be more strongly adhered to peel-off layer 210 than to substrate 22 such that adhesive layer 220 remains attached to peel-off layer 210 while and after peel-off layer 210 is peeled off. Adhesive layer 220 may have insufficient strength to resist a peel force applied by a user to information security label 200, thereby allowing the user to manually remove peel-off layer 210 in a single continuous strip of material 214, taking adhesive layer 220 with peel-off layer 210. Adhesive layer 220 may have sufficient strength to resist a shear force applied by a user to information security label 200 such that peel-off layer 210 may not be sheared off of substrate 22, along with adhesive layer 220, without disturbing the original appearance of peel-off layer 210.

In some embodiments, cut 240 may be a groove cut, meaning the material along the path of cut 240 is continuously separated. In some embodiments, cut 240 may be a perforated cut, meaning the material along the path of cut 240 includes perforations that sufficiently weaken the material such that the material splits apart along the path of cut 240 when peeled away from substrate 22 by a user.

As shown in FIG. 9, first end 242 of cut 240 may intersect with perimeter 206 and may define a side 213 of pull-tab 212, and second end 244 of cut 240 may be disposed immediately in front of pull-tab 212. Beginning at first end 242, cut 240 may follow an inwardly spiraling path toward the center of information security label 200 that then continuously transitions to an outwardly spiraling path away from the center of information security label 200 that terminates at second end 244. Between first and second ends 242, 244, cut 240 may include straight sections 248 that are parallel to each other, and that are continuously connected to each other by arcuate sections 246. The inwardly and outwardly spiraling paths of cut 240 may be substantially concentric, which is to say that they wind around the same, general central portion of information security label 200.

Cut 240 may define two continuous pathways of material 214 that begin immediately in front of pull-tab 212 and terminate at termination points 216 within perimeter 206 of information security label 200. Pathways 214 may be continuous with each other, such that pathways 214 define a single continuous spine, which may be oriented in different directions. Pathways 214 (e.g., connected together at pull-tab 212 to form a single, continuous spine) may come together to cover visual information 24 when adhered to substrate 22 (e.g., a surface of a transaction card), and may come apart (e.g., upon removal of pathways 214 from substrate 22) to show visual information 24. Pathways 214 may be spirally shaped and may include both straight and curved segments that correspond to the path defined by cut 240. The distance between the area immediately in front pull-tab 212 and termination points 216, as measured along pathway 214, defines the length of each pathway 214. In some embodiments, the length of each pathway 214 may be at least two times as long as the intact length 205 of information security label 200. In some embodiments, the combined length of the two spiral pathways may be at least four times as long as the intact length 205 of information security label 200. In some embodiments, each of the two pathways is of a different length. In some embodiments, cut 240 defines more or fewer than two continuous pathways. For example, cut 240 may define a single continuous pathway, or may define 3, 4, 5, or more continuous pathways. In some embodiments multiple cuts 240 may be used to form such multiple pathways.

As illustrated in FIGS. 4-8, when a user 500 pulls on pull-tab 212, pathways 214 may peel off of substrate 22 simultaneously, beginning around perimeter 206 of information security label 200 and ending within perimeter 206 at termination points 216. In some embodiments, one pathway 214 may terminate and detach from substrate 22 while the other pathway 214 remains attached to substrate 22 and continues to peel away from substrate 22.

Figure 11:
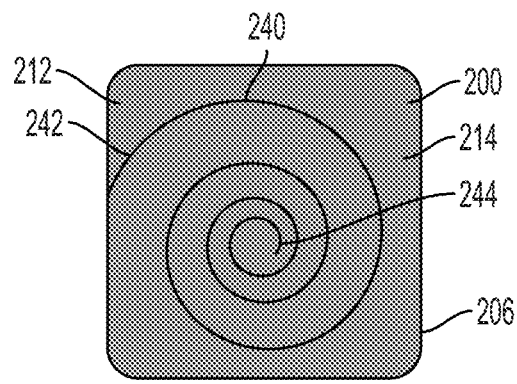
FIG. 11 shows another embodiment of an information security label.
Figure 12:
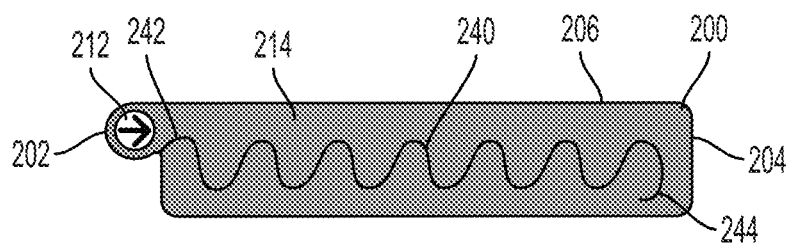
FIG. 12 shows another embodiment of an information security label.

Cut 240 may follow a variety of complexly shaped paths and may include any number of curves and/or straight sections. Cut 240 is shown in FIG. 9 to follow a path defined by two substantially concentric spirals, however, cut 240 may follow a variety of differently shaped paths that may define a variety differently shaped pathways 214. As shown in FIG. 11, for example, cut 240 may follow a single spiral-shaped path, and may define a spiral-shaped pathway 214, such that when a user pulls on pull-tab 212, peel-off layer 210 may peel off of substrate 22 beginning around perimeter 206 and ending at the center of the label 200. As shown in FIG. 12, for example, cut 240 may follow a wave-shaped path (e.g., following a serpentine or sinusoidal path). In such an example, cut 240 may define a substantially horizontal pathway 214, such that when a user pulls on pull-tab 212, peel-off layer 210 may peel off of substrate 22 beginning at first end 202, then toward second end 204, then back toward first end 202. In some embodiments, cut 240 may follow a path that combines features of a spiral path and a wave-shaped path, whether curved, rectilinear, or both.

In some embodiments, pathways 214 may have a width 215 (see FIG. 9) of at least 1 millimeter. In some embodiments, pathways 214 may have a width 215 of between 1 and 5 millimeters. In some embodiments, pathways 214 may have sufficient shear and tensile strength to resist breaking or tearing when pathways 214 are peeled away from substrate 22. In some embodiments, the width 215 of pathways 214 may vary along the lengths of pathways 214.

Cut 240 may follow a continuous, smooth path with no sharp corners or abrupt transitions. Sharp corners or abrupt transition may increase the stress concentration in pathways 214 at the corners or transitions, which may promote breaking or tearing of pathways 214. Accordingly, arcuate sections 246 of cut 240 may have a sufficiently large radius to reduce the stress concentrations in pathways 214, such that as pathways 214 are peeled away from substrate 22, pathways 214 do not tear or break apart as they change direction. In some embodiments, the radius of arcuate sections 246 may be at least 0.5 millimeters. In some embodiments, the radius of arcuate sections 246 may be between 1 and 5 millimeters.

Once removed from substrate 22, continuous pathways 214 may be connected only at their origin near pull-tab 212. Although continuous pathways 214 may be connected at pull-tab 212 and removed from substrate 22 as one continuous piece, peel-off layer 210 is no longer intact, which is to say it is no longer in its original shape and configuration.

In some embodiments, visual information 24 may be located centrally beneath the security label such that a user may peel away a portion of the information security label 200 without revealing visual information 24. In some embodiments, a user must peel off greater than 40-60% of the peel-off layer before any portion of visual information 24 is revealed. In some embodiments, a user 500 must peel off between 60 and 80% of the peel-off layer before any portion of visual information 24 (e.g., a full text character) is revealed. In some embodiments, a user 500 must peel off greater than 80-95% of the peel-off layer before all of visual information 24 is revealed.

The splitting apart of peel-off layer 210 as it is removed from substrate 22, makes it difficult to recreate the original appearance of information security label 200 after a portion of the peel-off layer 210 has been removed. In some embodiments, visual information 24 is not visible until after a sufficient portion of peel-off layer 210 has been removed such that the original appearance of information security label 200 cannot be recreated. In some embodiments, the original appearance of information security label 200 cannot be recreated after between 50 and 80% of peel-off layer 210 has been removed. In some embodiments, the original appearance of information security label 200 cannot be recreated after 75% of peel-off layer 210 has been removed. In some embodiments, pathways 214 may retain some adhesive after removal from substrate 22, which may cause pathways 214 to stick to one another or to become entangled with one another, thereby making it difficult to recreate the original appearance of information security label 200.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A visual-information security system, comprising:
 a substrate having visual information thereon; and
 a tamper-evident label disposed over and concealing the information, the label comprising a peel-off layer comprising a pull-tab and having a cut extending through the peel-off layer, wherein the peel-off layer is adhered to the substrate,
 wherein the cut of the peel-off layer is at least three times as long as a maximum in-tact length of the label,
 wherein when the pull-tab is pulled away from the substrate, the peel-off layer separates along the cut to peel off of the substrate in a single continuous strip to reveal the information, and
 wherein the peel-off layer is formed of a scratch-off ink, and can be scratched off by a user instead of being peeled off.

2. The visual-information security system of claim 1, wherein the cut of the peel-off layer is defined by straight sections continuously connected by arcuate sections.

3. The visual-information security system of claim 2, wherein the straight sections are parallel to each other.

4. The visual-information security system of claim 1, wherein the cut through the peel-off layer is only cut through the peel-off layer.

5. The visual-information security system of claim 4, wherein the cut forms a pair of concentric spirals.

6. The visual-information security system of claim 1, wherein the information is located centrally beneath the label, and
 wherein when the pull-tab is pulled away from the substrate, greater than 50% of the peel-off layer is peeled off before a full text character of the information is revealed.

7. The visual-information security system of claim 1, wherein the visual information is printed on the substrate.

8. The visual-information security system of claim 1, further comprising an adhesive layer disposed between the peel-off layer and the substrate, the adhesive layer adhering the peel-off layer to the substrate.

9. The visual-information security system of claim 8, wherein the peel-off layer is opaque and wherein the adhesive layer is transparent.

10. The visual-information security system of claim 1, wherein when the pull-tab is pulled away from the substrate, greater than 90% of the peel-off layer is peeled off before the information is fully revealed.

11. The visual-information security system of claim 8, further comprising a deadening layer disposed between the pull-tab and the substrate, wherein the deadening layer reduces the adhesion of the pull-tab to the substrate.

12. An information security label for removably concealing information, the label comprising:
 a concealing layer comprising a pull-tab and having a single, continuous, smooth cut extending through the concealing layer,
 an adhesive layer disposed beneath the concealing layer, and a deadening layer disposed beneath the pull-tab of the concealing layer, wherein the cut defines a spiral pathway of the label, the spiral pathway originating at the pull-tab and terminating within the label at a position spaced away from any outer edge of the label, wherein the cut goes through the concealing layer, but does not go through the adhesive layer, and wherein the deadening layer reduces adhesive properties of the adhesive layer beneath the pull-tab.

13. The information security label of claim 12, wherein the spiral pathway is at least three times as long as a maximum linear length of the label.

14. The information security label of claim 12, wherein the spiral pathway of the label comprises a first spiral pathway and a second spiral pathway defined by the cut, the second spiral pathway originating at the pull-tab and terminating within the label at a position spaced away from any outer edge of the label.

15. The information security label of claim 14, wherein a combined length of the first spiral pathway and the second spiral pathway is at least six times as long as a maximum linear length of the label.

16. The information security label of claim 12, wherein the cut begins within the label immediately in front of the pull-tab, and wherein the cut ends at an outer edge of the label and defines a side of the pull-tab.

17. A transaction card, comprising:

confidential information disposed on a surface of the transaction card; and a tamper-evident label disposed over the confidential information and temporarily adhered to the surface of the card, the label concealing the confidential information when adhered to the surface of the card, the label being configured to be removed from the surface of the card to show the confidential information disposed below the label, the label having a single continuous spine including portions oriented in different directions, the portions together cover the confidential information when adhered to the surface of the card and come apart to show the confidential information when removed.

18. The transaction card of claim 17, wherein the portions of the single continuous spine include two continuous pathways of material connected together at a pull tab.

19. The transaction card of claim 17, wherein the single continuous spine forms a spiral.

* * * * *